(12) United States Patent
Pusukuri et al.

(10) Patent No.: US 11,354,286 B1
(45) Date of Patent: Jun. 7, 2022

(54) OUTLIER IDENTIFICATION AND REMOVAL

(71) Applicant: Workday, Inc., Pleasanton, CA (US)

(72) Inventors: Kishore Kumar Pusukuri, Santa Clara, CA (US); Anant Rao, Fremont, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 17/087,391

(22) Filed: Nov. 2, 2020

(51) Int. Cl.
*G06F 16/00* (2019.01)
*G06F 16/215* (2019.01)
*G06F 16/28* (2019.01)

(52) U.S. Cl.
CPC .......... *G06F 16/215* (2019.01); *G06F 16/285* (2019.01)

(58) Field of Classification Search
CPC .................................................. G06F 16/215
USPC .......................................................... 707/692
See application file for complete search history.

(56) References Cited

U.S. PATENT DOCUMENTS

| | | | | |
|---|---|---|---|---|
| 2009/0271664 A1* | 10/2009 | Haas | ...................... | G06F 11/008 714/48 |
| 2014/0222394 A1* | 8/2014 | Drees | .................. | G06Q 10/0635 703/2 |
| 2015/0377906 A1* | 12/2015 | Wyrobek | ............... | G01N 21/00 702/19 |
| 2016/0026915 A1* | 1/2016 | Delp | .................. | G05B 23/0278 706/20 |
| 2017/0107576 A1* | 4/2017 | Babiarz | .................. | G06N 20/00 707/707 |
| 2018/0101561 A1* | 4/2018 | Ganjam | ................ | G06F 16/215 707/707 |
| 2019/0178654 A1* | 6/2019 | Hare | ......................... | G06T 7/70 707/707 |
| 2019/0316184 A1* | 10/2019 | Zimmermann | ...... | C12Q 1/6827 707/707 |
| 2020/0043186 A1* | 2/2020 | Selviah | ............... | G06V 10/7515 707/707 |
| 2020/0334278 A1* | 10/2020 | Ascough | ............... | G06N 3/0454 707/707 |

OTHER PUBLICATIONS

Hongfu Liu et al., ("Clustering with Outlier Removal," IEEE Transactions on Knowledge and Data Engineering, vol. XX, No. XX, Apr. 2019, pp. 1-11) (Year: 2019).*

* cited by examiner

*Primary Examiner* — Alexandria Y Bromell
(74) *Attorney, Agent, or Firm* — Van Pelt, Yi & James LLP (57) ABSTRACT

A system for outlier detection and removal comprises an interface and a processor. The interface is configured to receive a data set. The processor is configured to determine a cleaned data set by removing outliers, wherein determining the cleaned data set comprises determining a type of distribution, in response to the type of distribution being normal, determining the outliers using covariance estimation, in response to the type of distribution not being normal, determining the outliers using density based clustering, and determining the cleaned data set by removing the outliers from the data set, determine a coefficient of variation of the cleaned data set, determine whether the coefficient of variation is greater than a threshold coefficient of variation, and in response to the coefficient of variation being greater than the threshold coefficient of variation, determine a new cleaned data set by removing a new set of outliers from the cleaned data set.

18 Claims, 9 Drawing Sheets

OUTLIER IDENTIFICATION AND REMOVAL

BACKGROUND OF THE INVENTION

A system for big data processing comprises a system for receiving data, storing data, processing data, etc. Big data processing systems typically comprise a large number of subsystems that interact in order to complete a processing step. When monitoring the execution time for a processing step (e.g., in order to determine whether a code change has reduced the execution time), the complex set of interactions often results in a processing time with a large variation from run to run. Making a good estimation of the effective processing time requires collecting data on a large number of executions. The data typically includes both representative data (e.g., data representative of a run of the system) and a small amount of outlier data (e.g., data whose value has been skewed by an unusual or external event). Getting meaningful statistics typically requires discarding outlier data before computation. Techniques exist for identifying outliers in data; however, the techniques typically require the statistical data distribution to be known a priori. This creates a problem for systems where the expected data distribution is not known, it is difficult to identify and remove outliers from the data, and thus to determine meaningful statistics in order to diagnose computation problems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for outlier detection and removal is disclosed. The system comprises an interface and a processor. The interface is configured to receive a data set. The processor is configured to determine a cleaned data set by removing outliers, wherein determining the cleaned data set comprises determining a type of distribution, in response to the type of distribution being normal, determining the outliers using covariance estimation, in response to the type of distribution not being normal, determining the outliers using density based clustering, and determining the cleaned data set by removing the outliers from the data set, determine a coefficient of variation of the cleaned data set, determine whether the coefficient of variation is greater than a threshold coefficient of variation, and in response to the coefficient of variation being greater than the threshold coefficient of variation, determine a new cleaned data set by removing a new set of outliers from the cleaned data set. In some embodiments, the system further comprises a memory coupled to the processor and configured to store and provide the processor instructions.

The system iteratively determines outliers using a combination of a covariance estimation technique typically used for determination of outliers in a data set comprising primarily normally distributed data, and a hierarchical clustering algorithm typically used for determining data clustering properties within data comprising one or more clusters. The data set is received by the system along with a maximum number of outliers allowed to be removed from the data set and a threshold coefficient of variation representing a target coefficient of variation for a data set cleaned of outliers. The hierarchical clustering algorithm is executed on the data set to determine a number of clusters formed by the data. In the event that the hierarchical clustering algorithm determines that the data forms a single cluster, the covariance estimation technique is executed on the data to determine outliers under the assumption that the data is normally distributed. One or more outliers can be found by the covariance estimation technique. In the event that the hierarchical clustering algorithm determines that the data forms more than one cluster, the output of the hierarchical clustering algorithm is used to identify one or more outliers (e.g., one or more outliers are reported by the hierarchical clustering algorithm in addition to the number of clusters determined). The one or more outliers determined (e.g., either by the covariance estimation technique or the hierarchical clustering algorithm) are removed from the data set to determine a cleaned data set.

The coefficient of variation of the cleaned data is determined. In the event that the coefficient of variation of the cleaned data set is less than the threshold coefficient of variation, it is determined that the data set has been sufficiently cleaned, and the cleaned data set is provided. In some embodiments, the cleaned data set, the outliers, the number of outliers, and/or the coefficient of variation is provided. In the event that the coefficient of variation of the cleaned data set is greater than the threshold coefficient of variation, it is determined that the data set has not yet been sufficiently cleaned, and the process for determining a cleaned data set by removing outliers is executed again to determine a new cleaned data set. The process continues until the coefficient of variation of a determined cleaned data set is less than the threshold coefficient of variation.

In some embodiments, prior to executing the process for determining a cleaned data set by removing outliers again, a total number of outliers is determined. The total number of outliers comprises the total number of outliers removed from the data set over all iterations of the process for determining a cleaned data set by removing outliers. For example, determining the total number of outliers comprises adding a number of outliers determined in a most recent iteration of the process for determining a cleaned data set by removing outliers to a previously determined total number of outliers. In the event it is determined that the total number of outliers is greater than the maximum number of outliers, it is determined that no more outliers can be removed from the data set, and the cleaned data set is provided. In some embodiments, the cleaned data set, the outliers, the number of outliers, and/or the coefficient of variation is provided.

In some embodiments, a method for determining a cleaned data set is disclosed. The method comprises receiving an input data set; determining a type of distribution of the input data set; identifying, in response to the type of distribution being of a first type, one or more outliers in the input data set using a first method of outlier identification; identifying, in response to the type of distribution being of a second type, the one or more outliers using a second method of outlier identification; and generating a cleaned data set by removing the one or more outliers from the input data set. In some embodiments, the first type comprises a normal distribution and the first method of the outlier identification comprises a covariance estimation method.

In some embodiments, a computer program product embodied in a non-transitory computer readable medium and comprising computer instructions for determining a cleaned data set is disclosed. The computer program product comprises instructions for receiving an input data set; determining a first cleaned data set by removing a first number of outliers from the input data set; performing a comparison of the number of outliers with a threshold number of outliers; determining, based on the comparison, a second cleaned data set by removing a second number of outliers from the first cleaned data set; and providing the second cleaned data set. In some embodiments, determining the first cleaned data set comprises: determining a type of distribution of the input data set; in response to the type of distribution being normal, determining the one or more outliers using covariance estimation; and in response to the type of distribution not being normal, determining the one or more outliers using density based clustering.

The system iteratively transforms a data set from a data set with outliers to a data set without outliers allowing for better computation determinations. The system improves the computer by determining outliers on data sets for which the distribution is not known a priori, allowing statistics to be accurately computed on a wide range of data sets. The data sets may include data sets of various data distributions (e.g., normal, log-normal, Weibull, gamma, uniform, or other data distribution) or combinations of different data distributions. Furthermore, the system is effective on both large and small data sets. By providing an effective and accurate means of identifying outliers on data sets, the system can conserve computing resources (e.g., processing power, compute time, memory, bandwidth, etc.) for systems that generate the data set and/or determine outliers in the data sets. In some cases, the computation determinations or statistics based on the system without outliers are used to determine whether or not a software system of a set of software systems is to be selected, whether a given software system is to be modified, or any other appropriate action based on the computation characterization.

Figure 1:
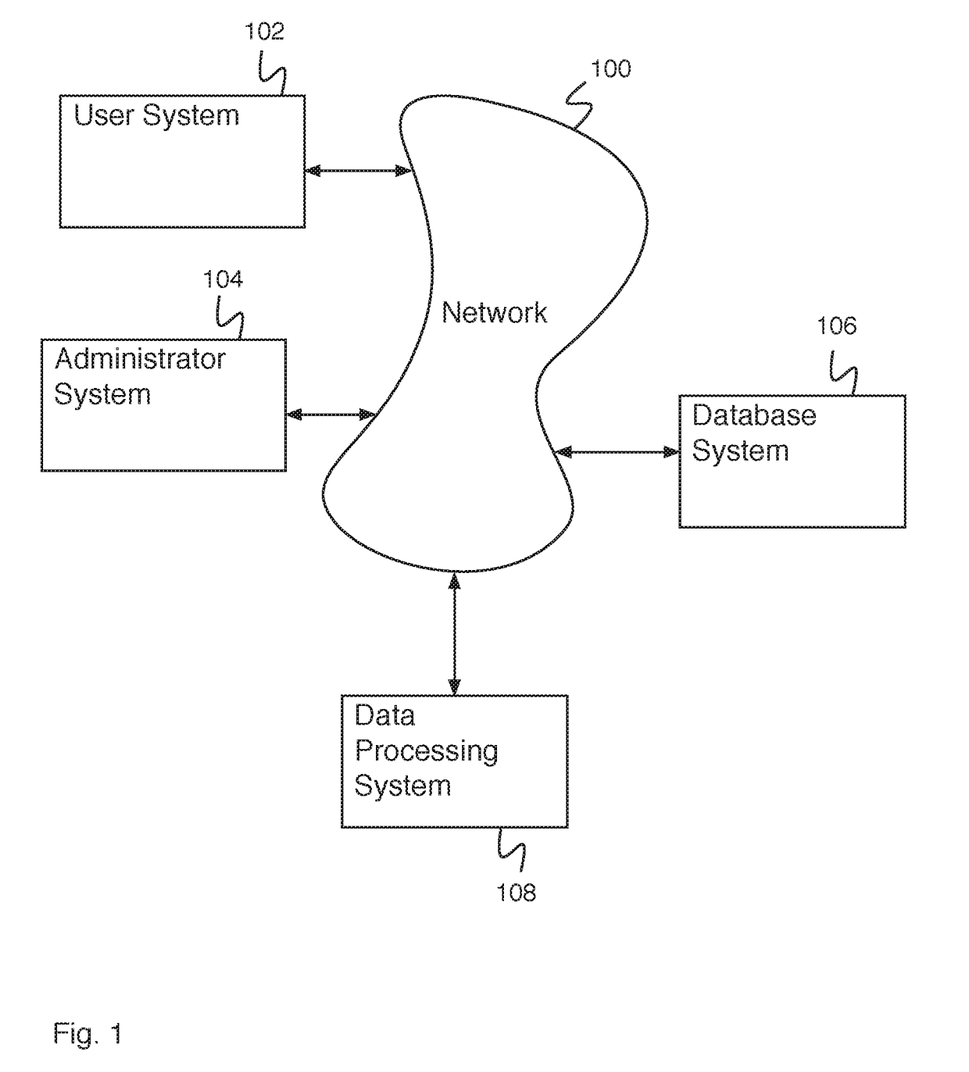
FIG. 1 is a block diagram illustrating an embodiment of a network system.

FIG. 1 is a block diagram illustrating an embodiment of a network system. In some embodiments, the network system of FIG. 1 comprises a network system for a system for planning. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, database system 106, and data processing system 108 communicate via network 100.

User system 102 comprises a user system for use by a user. For example, user system 102 comprises a system for communication, data access, computation, etc. A user uses user system 102 to access database system 106. For example, a user uses user system 102 to access human resources database data on database system 106, a user uses user system 102 to access financial database data on database system 106, a user uses user system 102 to access an organizational structure on database system 106, a user uses user system 102 to modify data on database system 106, a user uses user system 102 to delete data on database system 106, etc. A user additionally uses user system 102 to access data processing system 108, either directly or via database system 106.

Administrator system 104 comprises an administrator system for use by an administrator. For example, administrator system 104 comprises a system for communication, data access, computation, etc. An administrator uses administrator system 104 to maintain database system 106 and data processing system 108. For example, an administrator uses administrator system 104 to start and/or stop services on database system 106 or data processing system 108, to reboot database system 106 or data processing system 108, to install software on database system 106 or data processing system 108, to add, modify, and/or remove data on database system 106 or data processing system 108, etc. Database system 106 comprises a database system for storing data. For example database system 106 comprises a database system for storing data in a table-based data structure, an object-based data structure, etc. Database system 106 comprises a business database system, a human resources database system, an organizational structure, a financial database system, a university database system, a medical database system, a manufacturing database system, etc. Data processing system 108 comprises a system for processing data. For example, data processing system 108 comprises a system for processing big data, a cluster system for processing data, a multiprocessor system, a system comprising a plurality of virtual machines, etc. A user (e.g., a user using user system 102 or an administrator using administrator system 104)

desires to determine statistics around data processing—for example, statistics on an amount of time it takes data processing system 108 to execute a job. In various embodiments, statistics comprise one or more of the following: statistics related to a job or a portion of a job (e.g., a job broken into portions, streams, tasks, and/or batches for parallel processing, separate processing, segmented processing, serial processing, etc.); statistics related to processor or core use, memory use, transfer speed, and/or interface use; statistics related to machine hardware or virtual machine use; statistics related to random access memory, heap memory, cache memory, pool memory, read only memory, magnetic memory use, and/or hard drive memory use; statistics related to input and output (e.g., bytes, records, or blocks read, fetched, shuffled, or written, etc.); statistics related to data transfer time (e.g., fetch wait time, write time, etc.); statistics related to garbage collection; or any other appropriate statistics. In some embodiments, database system 106 is configured to cause data processing system 108 to execute a data processing job repeatedly for the purpose of gathering data on data processing job execution time. Executions of data processing jobs by data processing system 108 can take varying amounts of time as a result of initial conditions on the systems comprising data processing system 108, as a result of varying network traffic, as a result of additional load put on data processing system 108 during processing, etc. The execution times of data processing jobs additionally have outlier data points—for example, caused by an unusual extreme network bandwidth usage event, an unusual extreme memory usage event, an unusual extreme system processor usage event, etc. Database system 106 receives a data set from data processing system 108 comprising a set of execution times and determines statistics based on the data set. Database system 106 executes a process for removing outliers from the data set prior to determining the statistics.

For example, database system 106 comprises a an interface configured to receive a data set, and a processor configured to determine a cleaned data set by removing outliers, wherein determining the cleaned data set comprises determining a type of distribution, in response to the type of distribution being normal, determining the outliers using covariance estimation, in response to the type of distribution not being normal, determining the outliers using density based clustering, and determining the cleaned data set by removing the outliers from the data set, determine a coefficient of variation of the cleaned data set, determine whether the coefficient of variation is greater than a threshold coefficient of variation, and in response to the coefficient of variation being greater than the threshold coefficient of variation, determine a new cleaned data set by removing a new set of outliers from the cleaned data set.

Figure 2:
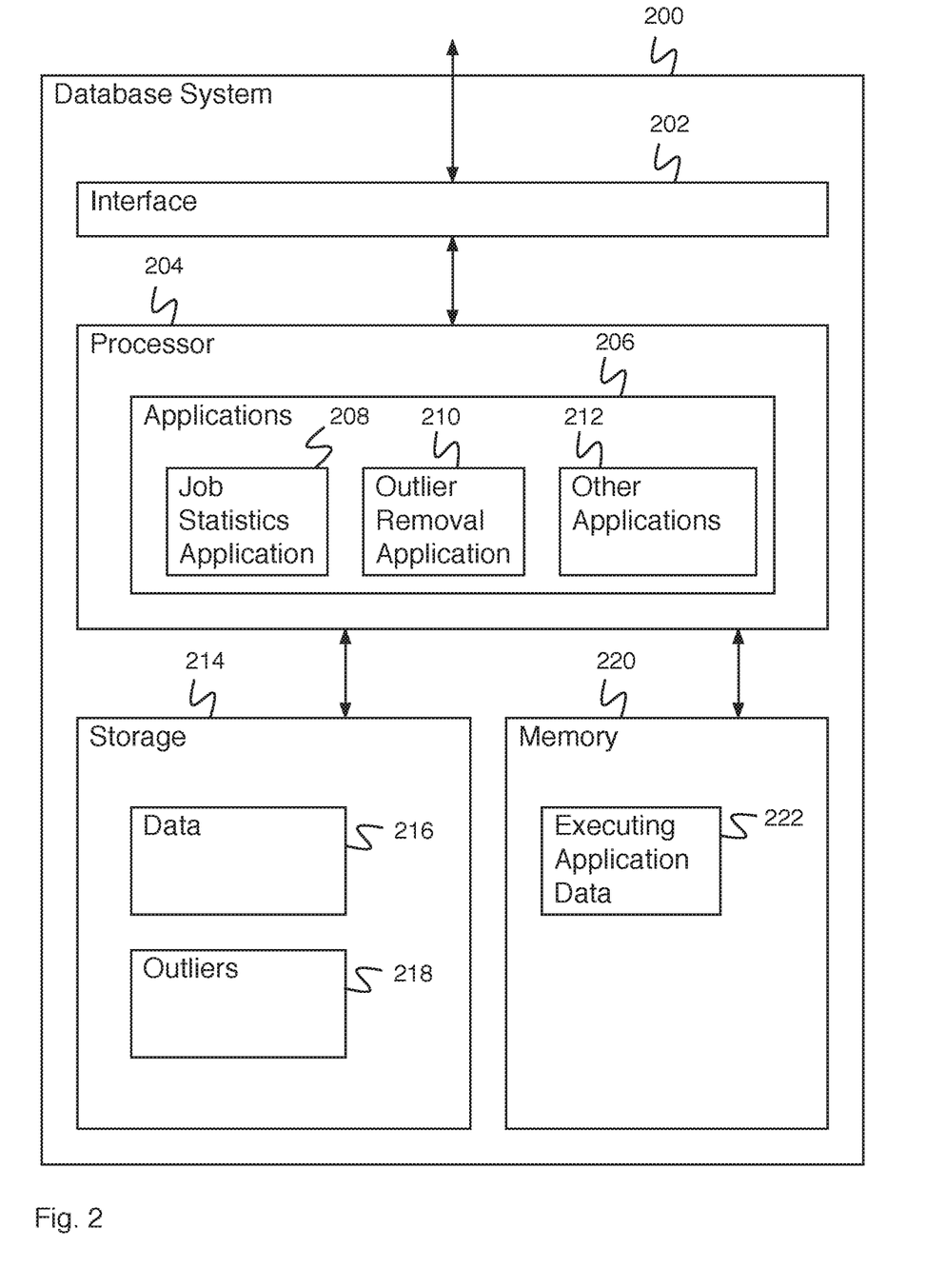
FIG. 2 is a block diagram illustrating an embodiment of a database system.

FIG. 2 is a block diagram illustrating an embodiment of a database system. In some embodiments, database system 200 comprises database system 106 of FIG. 1. In the example shown, database system 200 comprises interface 202. For example, interface 202 comprises an interface for receiving data, providing data, receiving a request to determine a statistic, providing a statistic, etc. Processor 204 comprises a processor for executing applications 206. Applications 206 comprises job statistics application 208, outlier removal application 210, and other applications 212. Job statistics application 208 comprises an application for determining a statistic for a job. For example, job statistics application 208 comprises an application for requesting a set of job execution data from data processing system 108, receiving a set of job execution data from data processing system 108, removing outliers from the set of job execution data to determine a set of cleaned job execution data, and determining a statistic based at least in part on the set of cleaned job execution data. Outlier removal application 210 comprises an application for removing outliers. In some embodiments, outlier removal application 210 comprises an application for removing outliers from a set of job execution data to determine a set of cleaned job execution data. For example, outlier removal application 210 comprises an application configured to determine a cleaned data set by removing outliers, wherein determining the cleaned data set comprises determining a type of distribution. In response to the type of distribution being a first type (e.g., a normal distribution), the outlier removal application 210 can determine the outliers using a first method (e.g., covariance estimation). In response to the type of distribution being a second type (e.g., not a normal distribution), the outlier removal application 210 can determine the outliers using a second method (e.g., density based clustering). The outlier removal application 210 may further determine the cleaned data set by removing the outliers from the data set, determine a coefficient of variation of the cleaned data set, determine whether the coefficient of variation is greater than a threshold coefficient of variation, and in response to the coefficient of variation being greater than the threshold coefficient of variation, determine a new cleaned data set by removing a new set of outliers from the cleaned data set.

Other applications 212 comprise any other appropriate applications (e.g., a communications application, a chat application, a web browser application, a document preparation application, a report preparation application, a user interface application, a data analysis application, etc.). Storage 214 comprises data 216 (e.g., received data for determination of statistics and/or removal of outliers) and outliers 218 (e.g., outlier data points removed from one or more data sets). Memory 220 comprises executing application data 222 comprising data associated with applications 206.

Figure 3:
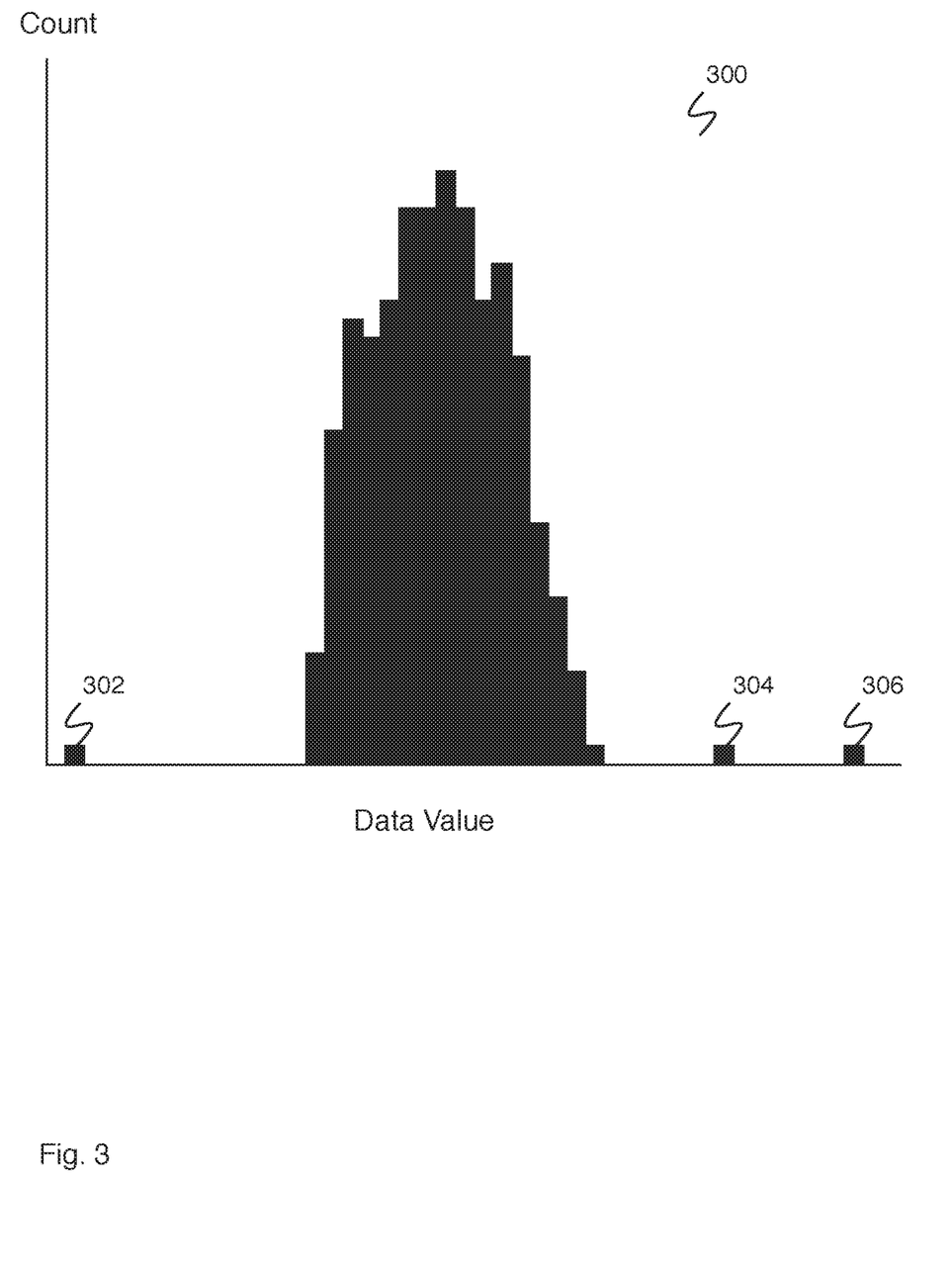
FIG. 3 is a diagram illustrating an embodiment of a data histogram.

FIG. 3 is a diagram illustrating an embodiment of a data histogram. In some embodiments, data histogram 300 comprises a histogram of job execution time data. In the example shown, data histogram 300 comprises a set of vertical bars, each bar representing a number of times a particular data value occurred in a data set. In the example shown, data histogram 300 indicates that the bulk of the data values in the data set occur in a single cluster, and that there are a small number of outlier data points that are not part of the single cluster. The system for outlier detection and removal is designed to detect outlier 302, outlier 304, and outlier 306 either one at a time or in one or more groups. In some cases, the outliers are detected and removed iteratively up until a maximum number of outliers are detected (e.g., in the event the maximum number of outliers is 2 then iterative detection of outliers stops after detecting and removing outlier 302 and outlier 306). In some cases, the outliers are detected iteratively up until a coefficient of variation is below a threshold (e.g., after outlier 302, outlier 304, and outlier 306 are detected and removed).

Figure 4:
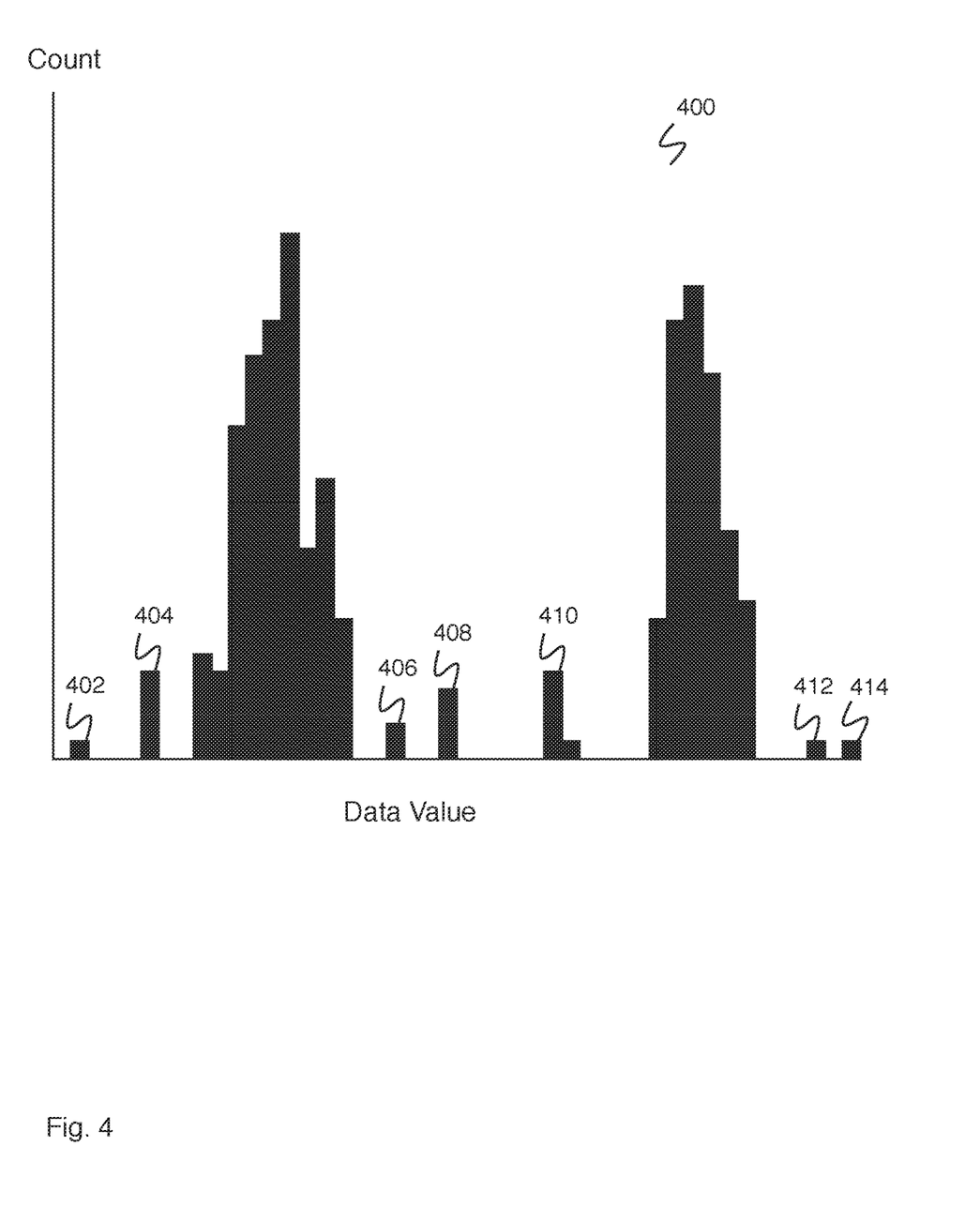
FIG. 4 is a diagram illustrating an embodiment of a data histogram.

FIG. 4 is a diagram illustrating an embodiment of a data histogram. In some embodiments, data histogram 400 comprises a histogram of job execution time data. In the example shown, data histogram 400 comprises a set of vertical bars, each bar representing a number of times a particular data value occurred in a data set. In the example shown, data histogram 400 indicates that the bulk of the data values in the data set occurs in two clusters, and that there are a small number of outlier data points that are not part of the two clusters. The system for outlier detection and removal is designed to identify and remove outliers—for example, outlier 402, outlier group 404, outlier group 406, outlier group 408, outlier group 410, outlier 412, and outlier 414. In some cases, the outliers are detected and removed iteratively up until a maximum number of outliers are detected (e.g., in the event the maximum number of outliers is 6 then iterative detection of outliers stops after detecting and removing outlier 402, outlier group 408, and outlier 414). In some cases, the outliers are detected iteratively up until a coefficient of variation is below a threshold (e.g., after outlier 402, outlier group 404, outlier group 406, outlier group 408, outlier group 410, outlier 412, and outlier 412 are detected and removed).

Figure 5A:
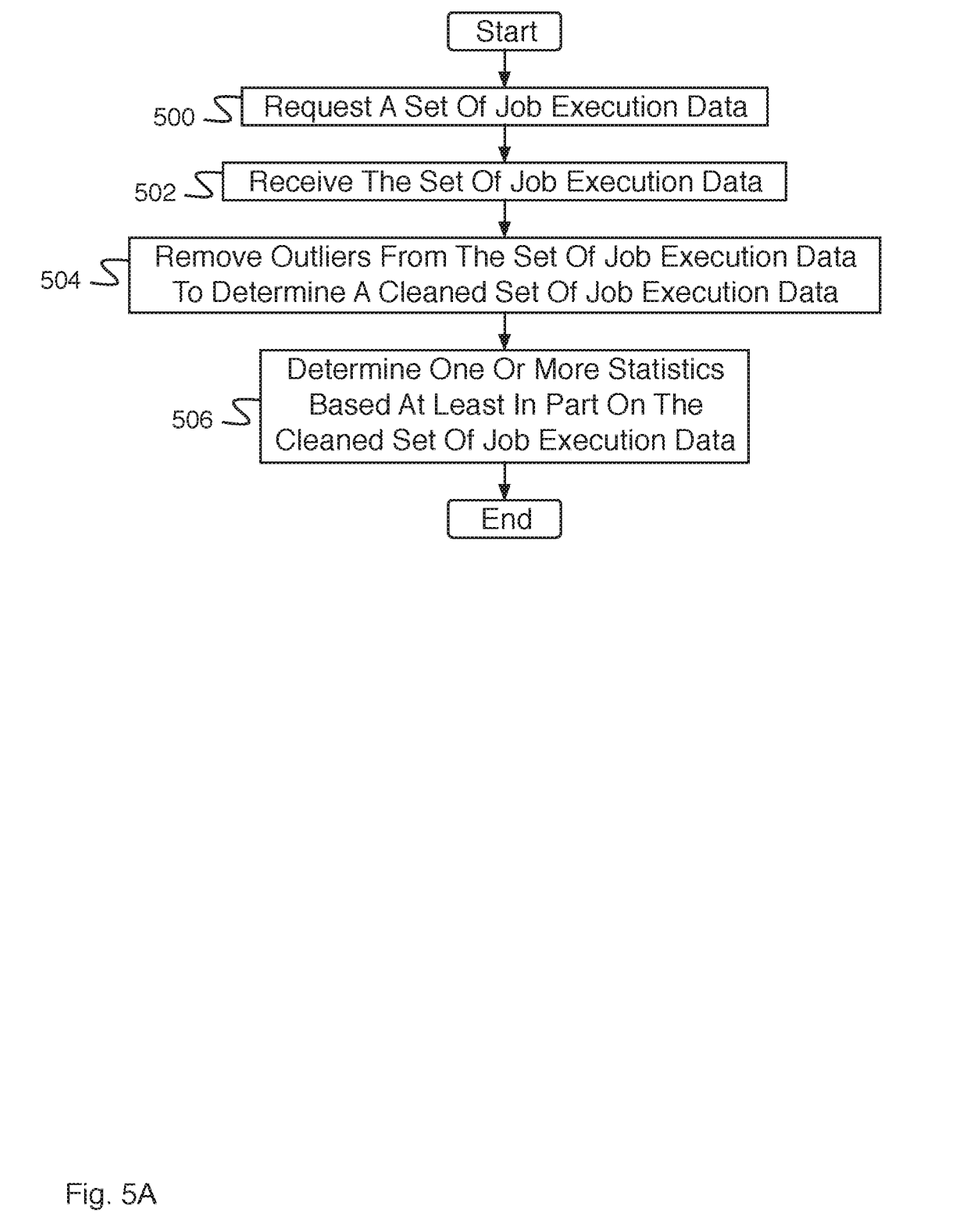
FIG. 5A is a flow diagram illustrating an embodiment of a process for determining statistics.

FIG. 5A is a flow diagram illustrating an embodiment of a process for determining statistics. In some embodiments, the process of FIG. 5A comprises a process for determining statistics based at least in part on data processing job execution data. In some embodiments, the process of FIG. 5A is executed by database system 106 of FIG. 1. In the example shown, in 500, a set of job execution data is requested (e.g., from data processing system 108 of FIG. 1). In 502, the set of job execution data is received. In 504, outliers are removed from the set of job execution data to determine a cleaned set of job execution data. In 506, one or more statistics are determined based at least in part on the cleaned set of job execution data.

Figure 5B:
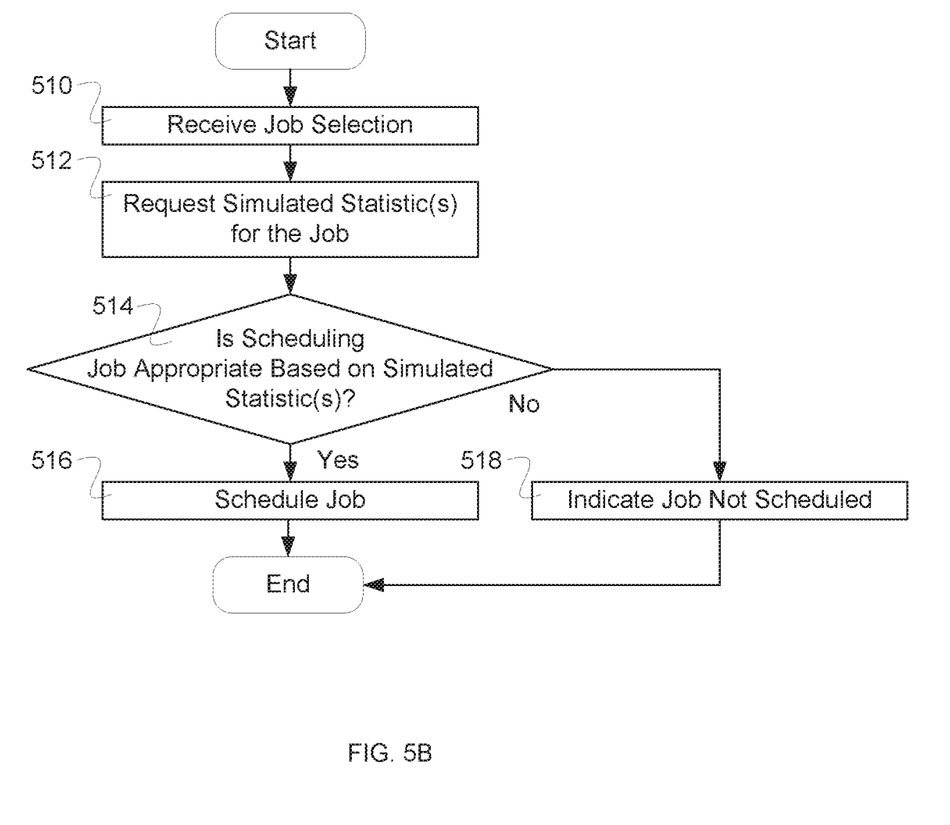
FIG. 5B is a flow diagram illustrating an embodiment of a process for job scheduling.

FIG. 5B is a flow diagram illustrating an embodiment of a process for job scheduling. In some embodiments, the process of FIG. 5B is executed by database system 106 of FIG. 1. In the example shown, in 510 a job selection is received. In 512, simulated statistic(s) is/are requested for the job. In 514, it is determined whether scheduling the job is appropriate based on the simulated statistic(s). In response to determining that scheduling the job is appropriate, in 516 the job is scheduled. In response to determining that scheduling the job is not appropriate, in 518 indicating that the job is not scheduled.

Figure 5C:
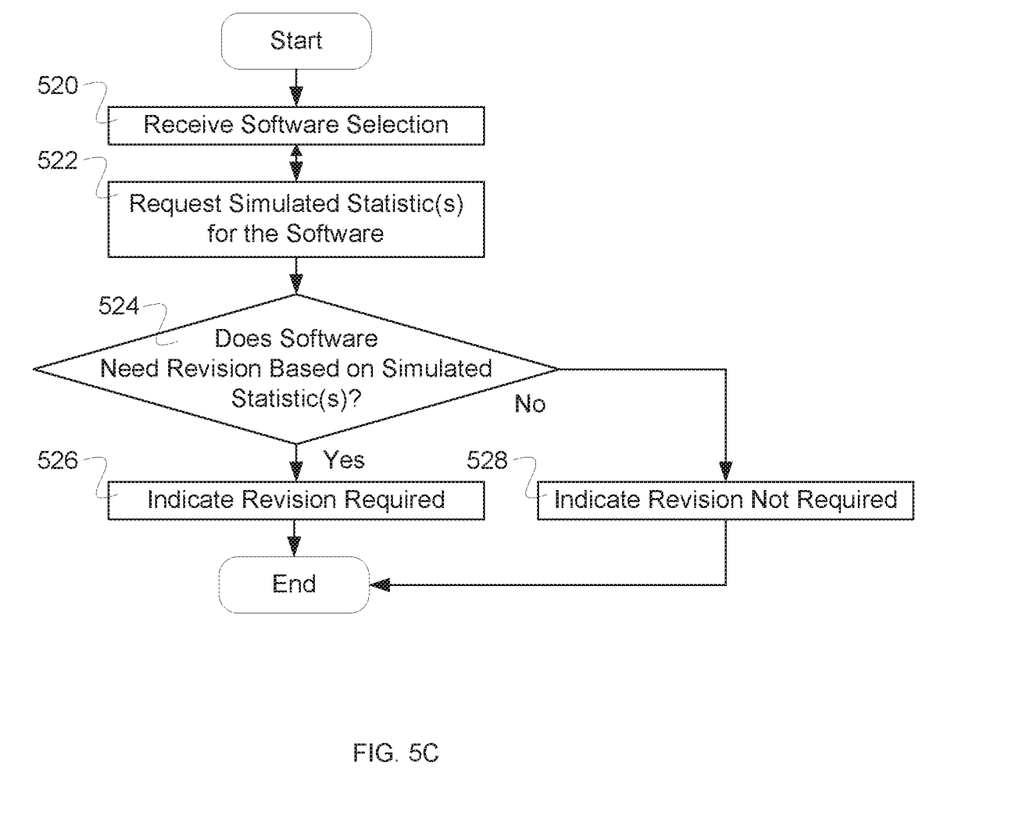
FIG. 5C is a flow diagram illustrating an embodiment of a process for job scheduling.

FIG. 5C is a flow diagram illustrating an embodiment of a process for job scheduling. In some embodiments, the process of FIG. 5C is executed by database system 106 of FIG. 1. In the example shown, in 520 a software selection is received. In 522, simulated statistic(s) is/are requested for the software. In 524, it is determined whether the software needs revision based on the simulated statistic(s). In response to determining that the software needs revision, in 526 indicate revision is required. In response to determining that the software does not need revision, in 528 indicating that the software does not need revision.

Figure 6:
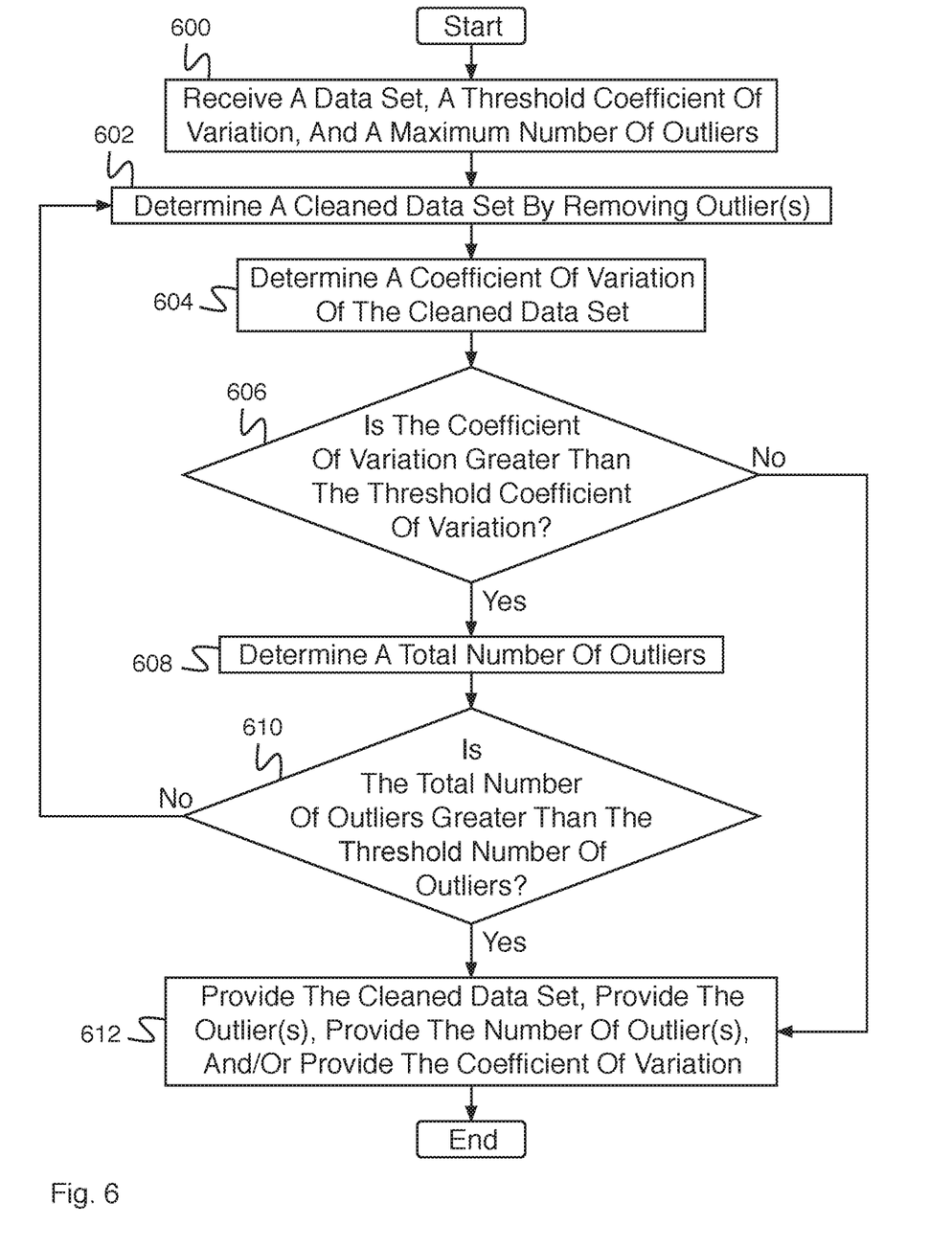
FIG. 6 is a flow diagram illustrating an embodiment of a process for removing outliers.

FIG. 6 is a flow diagram illustrating an embodiment of a process for removing outliers. In some embodiments, the process of FIG. 6 implements 504 of FIG. 5. In the example shown, in 600, a data set, a threshold coefficient of variation, and a threshold number of outliers (e.g., a maximum number of outliers) are received. For example, the data set, the threshold coefficient of variation, and the number of outliers are received from a user, from an administrator, from a process or other creator of jobs/tasks interested in determining statistics without the influence of outliers. In some embodiments, a process associated with monitoring performance of a system uses the process for removing outliers to preprocess data sets for statistics that evaluate performance without outliers (e.g., that may distort performance characteristics). In some embodiments, a threshold coefficient of variation is not received and a default threshold coefficient of variation is used, and/or a threshold number of outliers is not received and a default threshold number of outliers is used. In 602, a cleaned data set is determined by removing outlier(s). In various embodiments, the outlier(s) are determined one-by-one, the outlier(s) are determined in groups, or any other appropriate manner of removing outlier(s). In 604, a coefficient of variation of the cleaned data set is determined. In 606, it is determined whether the coefficient of variation is greater than the threshold coefficient of variation. In the event it is determined that the coefficient of variation is not greater than the threshold coefficient of variation, control passes to 612. In the event it is determined in 606 that the coefficient of variation is greater than the threshold coefficient of variation, control passes to 608. In 608, a total number of outlier(s) is determined. For example, a total number of outliers comprises a total number of outliers removed in iterations of 602. In some embodiments, the total number of outliers comprises the sum of a number of outliers removed (e.g., in 602) and a previous total number of outliers. A comparison between the total number of outliers and the threshold number of outliers is made. In 610, it is determined whether the total number of outliers is greater than the threshold number of outliers. In various embodiments, the comparison with the threshold uses a less than comparison or an equal to comparison as appropriate for the number of outliers (e.g., whether looking for a minimum, maximum, or specific value). In the event it is determined that the total number of outliers is not greater than the threshold number of outliers, control passes to 602. In the event it is determined that the total number of outliers is greater than the threshold number of outliers, control passes to 612. In 612, the cleaned data set is provided, the outlier(s) are provided, the number of outliers is provided, and/or the coefficient of variation is provided. For example, the cleaned data set is provided to the requestor, whether a user or a process, for further statistics determination and/or for determination of whether the process needs software revision, needs to be terminated, needs to be flagged or queued for further action, or any other appropriate action. In some cases, the number of outliers and/or coefficient of variation are used to determine whether a reevaluation of criteria for outlier detection criteria should be considered. In some embodiments, the providing of cleaned data, outliers, number of outliers, and/or coefficient of variation is displayed as a distribution, graphic, graph, or other display, provided as a list, or any other appropriate manner of providing the cleaned data, outliers, number of outliers, and/or coefficient of variation.

Figure 7:
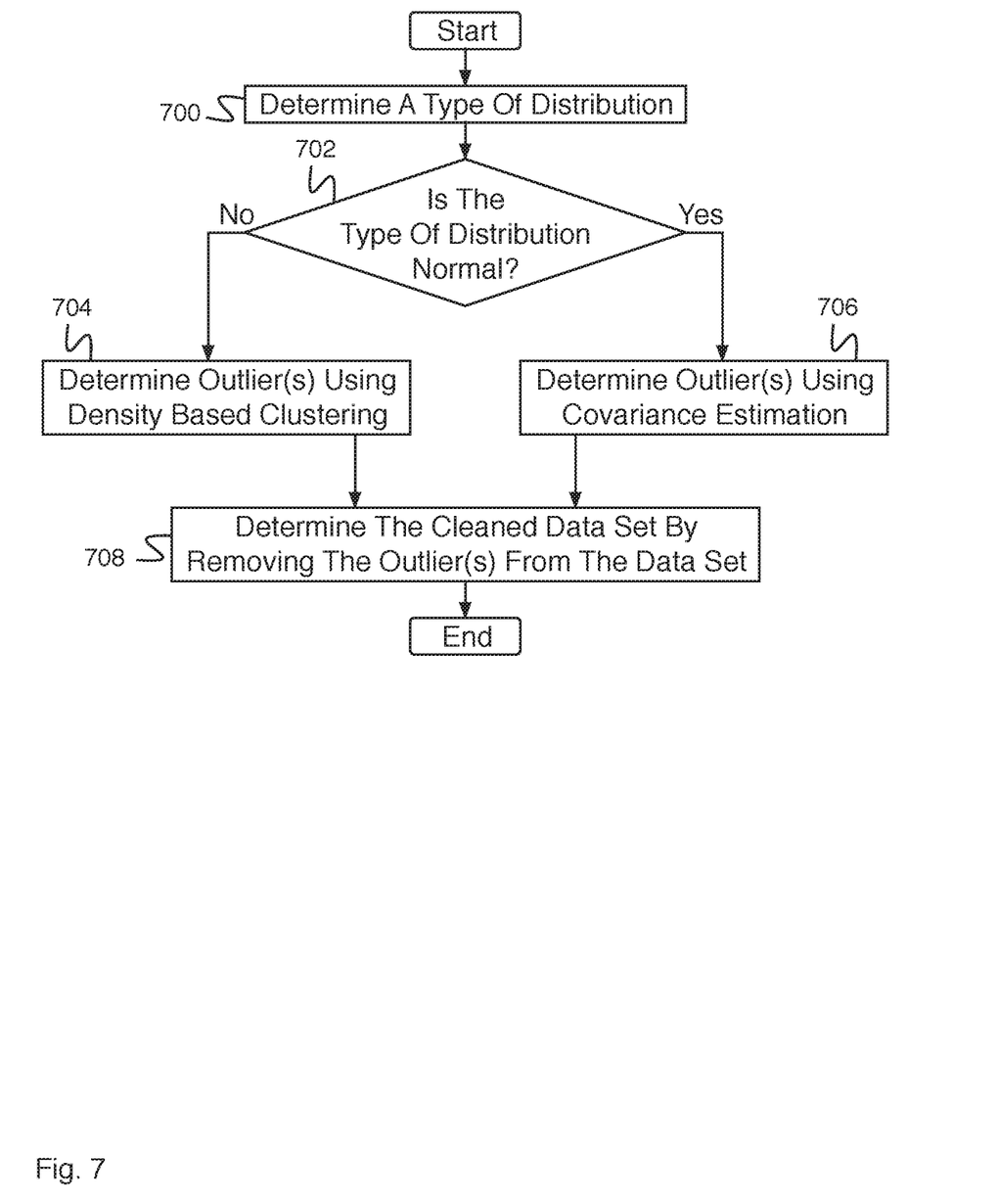
FIG. 7 is a flow diagram illustrating an embodiment of a process for determining a cleaned data set by removing outliers.

FIG. 7 is a flow diagram illustrating an embodiment of a process for determining a cleaned data set by removing outliers. For example, the data set comprises a single-dimensional data set or a multidimensional data set. In some embodiments, the process of FIG. 7 implements 604 of FIG. 6. In the example shown, in 700, a type of distribution is determined. For example, the type of distribution is determined by using a clustering algorithm (e.g., density-based spatial clustering of applications with noise, hierarchical density-based spatial clustering of applications with noise (HDBSCAN), K-means clustering, mean-shift clustering, expectation-maximization, gaussian mixture models, agglomerative hierarchical clustering, etc.). In the event the data set comprises a multidimensional data set, the type of distribution is determined by using a multidimensional clustering algorithm (e.g., multidimensional density-based spatial clustering of applications with noise, multidimensional hierarchical density-based spatial clustering of applications with noise (HDBSCAN), multidimensional K-means clustering, multidimensional mean-shift clustering, expectation-maximization, multidimensional gaussian mixture models, a multidimensional agglomerative hierarchical clustering, etc.). In 702, it is determined whether the distribution is normal. In some embodiments, the type of distribution is determined by executing a clustering algorithm, in response to an indication from the clustering algorithm that the data comprises one cluster, indicating that the type of distribution is normal, and in response to an indication from the clustering algorithm that the data comprises more than one cluster, indicating that the type of distribution is not normal. In the event it is determined that the distribution is not normal, control passes to 704. In 704, outlier(s) is/are determined using density based clustering (e.g., HDBSCAN). For example, one outlier is determined or more than one outlier is determined. In the event that the data set comprises a multidimensional data set outliers are determined using a multidimensional density-based clustering algorithm. Control then passes to 708. In the event it is determined in 702 that the type of distribution is normal, control passes to 706. In 706, outlier(s) is/are determined using covariance estimation (e.g., an elliptic envelope covariance estimation technique). For example, one outlier is determined or more than one outlier is determined. In the event that the data set comprises a multidimensional data set outliers are determined using multidimensional covariance estimation. In 708, the cleaned data set is determined by removing the outlier(s) from the data set.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   an interface configured to:
     receive an input data set; and
   a processor configured to:
     determine a cleaned data set by removing one or more outliers, wherein determining the cleaned data set comprises:
       determining a type of distribution of the input data set;
       in response to the type of distribution being normal, determining the one or more outliers using covariance estimation;
       in response to the type of distribution not being normal, determining the one or more outliers using density based clustering; and
     determining the cleaned data set by removing the one or more outliers from the input data set;
     determine a coefficient of variation of the cleaned data set;
     determine whether the coefficient of variation is greater than a threshold coefficient of variation; and
     in response to the coefficient of variation not being greater than the threshold coefficient of variation, provide the cleaned data set.

2. The system of claim 1, wherein the processor is further configured to:
   in response to the coefficient of variation being greater than the threshold coefficient of variation, determine a new cleaned data set by removing a new set of outliers from the cleaned data set.

3. The system of claim 1, wherein the interface is further configured to receive a maximum number of outliers.

4. The system of claim 1, wherein the processor is further configured to determine a total number of outliers.

5. The system of claim 4, wherein the total number of outliers comprises the total number of outliers removed from the input data set.

6. The system of claim 4, wherein the processor is further configured to:
   in response to the total number of outliers being greater than a maximum number of outliers, provide the cleaned data set, provide the outliers, provide the number of outliers, and/or provide the coefficient of variation.

7. The system of claim 1, wherein the processor is further configured to:
   in response to the coefficient of variation not being greater than the threshold coefficient of variation, provide the one or more outliers, provide a number of the one or more outliers, and/or provide the coefficient of variation.

8. The system of claim 1, wherein the type of distribution is determined using a clustering algorithm.

9. The system of claim 8, wherein the clustering algorithm comprises HDBSCAN.

10. The system of claim 8, wherein: in response to an indication from the clustering algorithm that the data comprises one cluster, determining that the type of distribution is normal.

11. The system of claim 8, wherein: in response to an indication from the clustering algorithm that the data comprises more than one cluster, determining that the type of distribution is not normal.

12. The system of claim 1, wherein covariance estimation comprises an elliptic envelope covariance estimation technique.

13. The system of claim 1, wherein density based clustering comprises HDBSCAN.

14. The system of claim 1, wherein the input data set comprises a single-dimensional data set.

15. The system of claim 1, wherein the input data set comprises a multidimensional data set.

16. The system of claim 15, wherein the density-based clustering algorithm comprises a multidimensional density-based clustering algorithm.

17. A method, comprising:
   receiving an input data set;
   determining a cleaned data set by removing one or more outliers, wherein determining the cleaned data set comprises:
     determining a type of distribution of the input data set;
     in response to the type of distribution being normal, determining the one or more outliers using covariance estimation;
     in response to the type of distribution not being normal, determining the one or more outliers using density based clustering; and
     determining the cleaned data set by removing the one or more outliers from the input data set;
   determining a coefficient of variation of the cleaned data set;
   determining whether the coefficient of variation is greater than a threshold coefficient of variation; and
   in response to the coefficient of variation not being greater than the threshold coefficient of variation, providing the cleaned data set.

18. A computer program product embodied in a non-transitory computer readable medium and comprising computer instructions for:
   receiving an input data set;

determining a cleaned data set by removing one or more outliers, wherein determining the cleaned data set comprises:
  determining a type of distribution of the input data set;
  in response to the type of distribution being normal, determining the one or more outliers using covariance estimation;
  in response to the type of distribution not being normal, determining the one or more outliers using density based clustering; and
  determining the cleaned data set by removing the one or more outliers from the input data set;
determining a coefficient of variation of the cleaned data set;
determining whether the coefficient of variation is greater than a threshold coefficient of variation; and
in response to the coefficient of variation not being greater than the threshold coefficient of variation, providing the cleaned data set.

\* \* \* \* \*

UNITED STATES PATENT AND TRADEMARK OFFICE
CERTIFICATE OF CORRECTION

PATENT NO. : 11,354,286 B1
APPLICATION NO. : 17/087391
DATED : June 7, 2022
INVENTOR(S) : Kishore Kumar Pusukuri and Anant Rao It is certified that error appears in the above-identified patent and that said Letters Patent is hereby corrected as shown below:

In the Specification

Column 5, Line 37, after "comprises", delete "a".

Signed and Sealed this
Thirty-first Day of January, 2023

Katherine Kelly Vidal
*Director of the United States Patent and Trademark Office*